US010562370B2

(12) United States Patent
Lee et al.

(10) Patent No.: US 10,562,370 B2
(45) Date of Patent: Feb. 18, 2020

(54) HEAT PUMP SYSTEM FOR VEHICLE

(71) Applicant: HANON SYSTEMS, Daejeon (KR)

(72) Inventors: Sung Je Lee, Daejeon (KR); Tae Yong Park, Daejeon (KR); Eun Young Seo, Daejeon (KR); Yong Nam Ahn, Daejeon (KR); Se Min Lee, Daejeon (KR); Seong Seok Han, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/305,361

(22) PCT Filed: Aug. 31, 2015

(86) PCT No.: PCT/KR2015/009115
§ 371 (c)(1),
(2) Date: Oct. 20, 2016

(87) PCT Pub. No.: WO2016/036079
PCT Pub. Date: Mar. 10, 2016

(65) Prior Publication Data
US 2017/0190236 A1    Jul. 6, 2017

(30) Foreign Application Priority Data

Sep. 1, 2014    (KR) .......................... 10-2014-0115151
Oct. 21, 2014   (KR) .......................... 10-2014-0142498

(51) Int. Cl.
*B60H 1/00*    (2006.01)

(52) U.S. Cl.
CPC ..... *B60H 1/00899* (2013.01); *B60H 1/00057* (2013.01); *B60H 1/00471* (2013.01);
(Continued)

(58) Field of Classification Search
CPC ............ B60H 1/00057; B60H 1/00899; B60H 2001/00085; B60H 2001/00099;
(Continued)

(56) References Cited

U.S. PATENT DOCUMENTS

| 5,115,727 A | * | 5/1992 | Becquerel | .......... | B60H 1/00471 |
| | | | | | 415/213.1 |
| 5,135,046 A | * | 8/1992 | Becquerel | .......... | B60H 1/00457 |
| | | | | | 165/122 |

(Continued)

FOREIGN PATENT DOCUMENTS

| EP | 1426213 A2 * | 6/2005 | ......... B60H 1/00028 |
| EP | 2072298 A1 | 6/2009 | |

(Continued)

OTHER PUBLICATIONS

Machine translation of EP 1426213; Retrieved Oct. 22, 2018 (Year: 2018).*

(Continued)

*Primary Examiner* — Eric S Ruppert
*Assistant Examiner* — Hans R Weiland
(74) *Attorney, Agent, or Firm* — Dickinson Wright PLLC

(57) ABSTRACT

Disclosed herein is a heat pump system for a vehicle which includes an evaporator mounted on a cold air passageway inside an air-conditioning case, a condenser mounted on a warm air passageway, a first blower mounted at an inlet side of the cold air passageway of the air-conditioning case, a second blower mounted at an inlet side of the warm air passageway and an intake duct mounted between the first blower and the second blower to supply indoor air and outdoor air to the first blower and the second blower respectively, thereby maximizing space efficiency because using just one intake duct for the two blowers, and reducing the size and manufacturing costs of the heat pump system.

20 Claims, 12 Drawing Sheets

(52) U.S. Cl.
CPC .............. *B60H 2001/00099* (2013.01); *B60H 2001/00107* (2013.01); *B60H 2001/00178* (2013.01)

(58) Field of Classification Search
CPC ........... B60H 2001/00121; B60H 2001/00135; B60H 2001/00178; B60H 3/06
See application file for complete search history.

(56) References Cited

U.S. PATENT DOCUMENTS

| | | | | |
|---|---|---|---|---|
| 6,016,967 | A * | 1/2000 | Takechi | B60H 1/00064 237/12.3 R |
| 6,422,309 | B2 * | 7/2002 | Vincent | B60H 1/00064 165/202 |
| 6,789,999 | B2 * | 9/2004 | Bikos | B60H 1/00471 415/206 |
| 7,931,075 | B2 * | 4/2011 | Ito | B60H 1/00028 165/122 |
| 2003/0056531 | A1 * | 3/2003 | Nishida | B60H 1/00064 62/244 |
| 2011/0036117 | A1 * | 2/2011 | Frohling | B60H 1/00028 62/507 |
| 2013/0042637 | A1 * | 2/2013 | Richter | B60H 1/00057 62/79 |
| 2014/0075974 | A1 * | 3/2014 | Klein | B60H 1/00057 62/119 |
| 2016/0001628 | A1 * | 1/2016 | Kakizaki | B60H 1/00899 62/157 |

FOREIGN PATENT DOCUMENTS

| | | |
|---|---|---|
| EP | 2716478 A1 | 4/2014 |
| JP | H05178068 A | 7/1993 |
| JP | H05221229 A | 8/1993 |
| JP | 2004182224 A | 7/2004 |
| JP | 2013151183 A | 8/2013 |
| JP | 2013209006 A | 10/2013 |
| KR | 20120027670 A | 3/2012 |

OTHER PUBLICATIONS

International Search Report and Written Opinion dated Dec. 15, 2015 from International Patent Application Serial No. PCT/KR2015/009115, with English translation of International Search Report.

* cited by examiner

Prior Art

Prior Art

HEAT PUMP SYSTEM FOR VEHICLE

CROSS-REFERENCE TO RELATED APPLICATIONS

This application is a U.S. National Stage of International Application No. PCT/KR2015/009115, filed Aug. 31, 2015, which claims the benefit and priority of KR 10-2014-0115151 filed Sep. 1, 2014 and KR 10-2014-0142498 filed Oct. 21, 2014. The entire disclosures of each of the above applications are incorporated herein by reference.

TECHNICAL FIELD

The present invention relates to a heat pump system for a vehicle, and more particularly, to a heat pump system for a vehicle which includes an evaporator mounted on a cold air passageway inside an air-conditioning case, a condenser mounted on a warm air passageway, a first blower mounted at an inlet side of the cold air passageway of the air-conditioning case, a second blower mounted at an inlet side of the warm air passageway and an intake duct mounted between the first blower and the second blower to supply indoor air and outdoor air to the first blower and the second blower respectively.

BACKGROUND ART

In general, as shown in FIG. 1, an air conditioner system for a vehicle has a refrigeration cycle that includes: a compressor 1 for compressing and discharging refrigerant; a condenser 2 for condensing the refrigerant of high pressure discharged from the compressor 1; an expansion valve 3 for throttling the refrigerant condensed and liquefied in the condenser 2; and an evaporator 4 for exchanging heat between the liquefied refrigerant of low pressure throttled by the expansion valve 3 and air blown to the interior of the vehicle and evaporating the refrigerant to cool the air discharged to the interior of the vehicle due to heat absorption by evaporative latent heat, and that the compressor 1, the condenser 2, the expansion valve 3 and the evaporator 4 are connected with each other via refrigeration pipes. The air conditioner system cools the interior of the vehicle through the following refrigerant circulation process.

When a cooling switch (not shown) of the air conditioner system is turned on, first, the compressor 1 inhales and compresses gas-phase refrigerant of low-temperature and low-pressure while driving by driving power of an engine or a motor, and then sends the refrigerant in the gaseous phase of high-temperature and high-pressure to the condenser 2. Then, the condenser 2 condenses the gas-phase refrigerant into liquid-phase refrigerant of high-temperature and high-pressure by exchanging heat with outdoor air. After that, the liquid-phase refrigerant of high-temperature and high-pressure sent from the condenser 2 rapidly expands by a throttling action of the expansion valve 3 and is sent to the evaporator 4 in a wet-saturated state of low-temperature and low-pressure. The evaporator 4 exchanges heat between the refrigerant and air blown to the interior of the vehicle by a blower (not shown). Then, the refrigerant is evaporated in the evaporator 4 and discharged in a gaseous phase of low-temperature and low-pressure. After that, the gas-phase refrigerant is inhaled into the compressor 1, and then, recirculates the refrigeration cycle as described above.

The evaporator is mounted inside the air-conditioning case mounted to the interior of the vehicle to cool the interior of the vehicle. That is, the air blown by the blower (not shown) is cooled by evaporative latent heat of the liquid-phase refrigerant circulating inside the evaporator 4 and discharged to the interior of the vehicle in a cooled state so as to cool the interior of the vehicle.

Moreover, the interior of the vehicle is heated by a heater core (not shown) which is mounted inside the air-conditioning case and through which coolant of the engine circulates or by an electric heater (not shown) mounted inside the air-conditioning case.

In the meantime, the condenser 2 is mounted at the front side of the vehicle to radiate heat while exchanging heat with air.

Recently, a heat pump system which carries out heating and cooling only using a refrigeration cycle has been developed. As shown in FIG. 2, such a heat pump system includes: a cold air passageway 11 and a warm air passageway 12 which are partitioned inside one air-conditioning case 10; an evaporator 4 mounted on the cold air passageway 11 for cooling; and a condenser 2 mounted on the warm air passageway 12 for heating.

In this instance, an air outflow port 15 is formed at an outlet of the air-conditioning case 10 for supplying air to the interior of the vehicle, and an air discharge port 16 is also formed at the exist of the air-conditioning case 10 for discharging air to the exterior of the vehicle.

Furthermore, blowers 20 which are operated individually are respectively mounted at an inlet of the cold air passageway 11 and at an inlet of the warm air passageway 12.

Therefore, in a cooling mode, cold air cooled while passing through the evaporator 4 of the cold air passageway 11 is discharged to the interior of the vehicle through the air outflow port 15 to cool the interior of the vehicle, and in this instance, warm air heated while passing through the condenser 2 of the warm air passageway 12 is discharged to the exterior of the vehicle through the air discharge port 16.

In a heating mode, warm air heated while passing through the condenser 2 of the warm air passageway 12 is discharged to the interior of the vehicle through the air outflow port 15 to heat the interior of the vehicle, and in this instance, cold air cooled while passing through the evaporator 4 of the cold air passageway 11 is discharged to the exterior of the vehicle through the air discharge port 16.

However, in case of the heat pump system according to the prior art, the blowers 20 are respectively mounted at the inlet sides of the cold air passageway 11 and the warm air passageway 12, and intake ducts (not shown) for supplying indoor air and outdoor air to the blowers 20 are respectively mounted on the blowers 20. In other words, because two intake ducts are respectively mounted on the two blowers 20, the heat pump system occupies a large installation space and the size and manufacturing costs of the heat pump system are increased.

DISCLOSURE

Technical Problem

Accordingly, the present invention has been made in an effort to solve the above-mentioned problems occurring in the prior arts, and it is an object of the present invention to provide a heat pump system for a vehicle which includes an evaporator mounted on a cold air passageway inside an air-conditioning case, a condenser mounted on a warm air passageway, a first blower mounted at an inlet side of the cold air passageway of the air-conditioning case, a second blower mounted at an inlet side of the warm air passageway and an intake duct mounted between the first blower and the second blower to supply indoor air and outdoor air to the first blower and the second blower respectively, thereby maximizing space efficiency because using just one intake duct for the two blowers, and reducing the size and manufacturing costs of the heat pump system.

Technical Solution

To achieve the above objects, the present invention provides a heat pump system for a vehicle which includes a compressor, a condenser, expansion means and an evaporator connected with one another through a refrigerant circulation line, further including: an air-conditioning case having a cold air passageway and a warm air passageway partitioned by a partition wall which partitions the inside of the air-conditioning case; a first blower which is mounted on an inlet of the cold air passageway of the air-conditioning case to blow air toward the cold air passageway; a second blower which is mounted on an inlet of the warm air passageway of the air-conditioning case to blow air toward the warm air passageway; and an intake duct which is communicatingly mounted between the first blower and the second blower to supply indoor air and outdoor air to the first blower and the second blower.

Advantageous Effects

As described above, the heat pump system for the vehicle according to the present invention includes an evaporator mounted on a cold air passageway inside an air-conditioning case, a condenser mounted on a warm air passageway, a first blower mounted at an inlet side of the cold air passageway of the air-conditioning case, a second blower mounted at an inlet side of the warm air passageway and an intake duct mounted between the first blower and the second blower to supply indoor air and outdoor air to the first blower and the second blower respectively, thereby maximizing space efficiency because using just one intake duct for the two blowers, and reducing the size and manufacturing costs of the heat pump system.

Moreover, the heat pump system according to the present invention includes the bypass door mounted between the cold air passageway and the warm air passageway so that some of the warm air heated while passing through the condenser is bypassed toward the evaporator of the cold air passageway, thereby increasing air volume induced into the evaporator, increasing temperature of the air induced into the evaporator even in the extremely low surroundings so as to allow the evaporator to smoothly absorb heat, increasing temperature of the air discharged to the interior of the vehicle due to increase of temperature and pressure of the refrigerant inside the system so as to enhance heating performance.

Furthermore, the heat pump system according to the present invention includes the discharge port of the first blower and the discharge port of the second blower which are arranged to cross each other so that the evaporator of the cold air passageway and the condenser of the warm air passageway can be arranged vertically, thereby maximizing space efficiency and reducing the size and manufacturing costs of the system because the system can be miniaturized easily and use the two blowers commonly.

MODE FOR INVENTION

Figure 1:
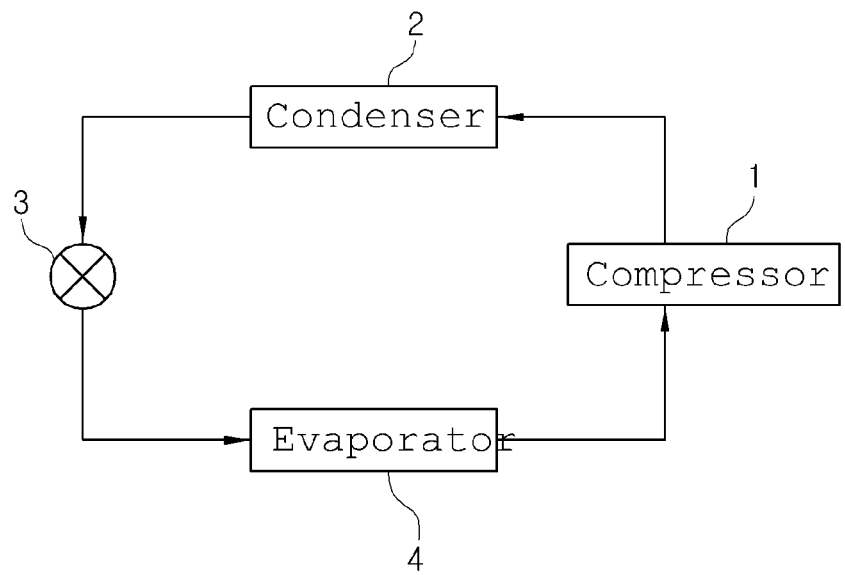
FIG. 1 is a configurative diagram showing a refrigeration cycle of a normal air conditioner system for a vehicle.
Figure 2:
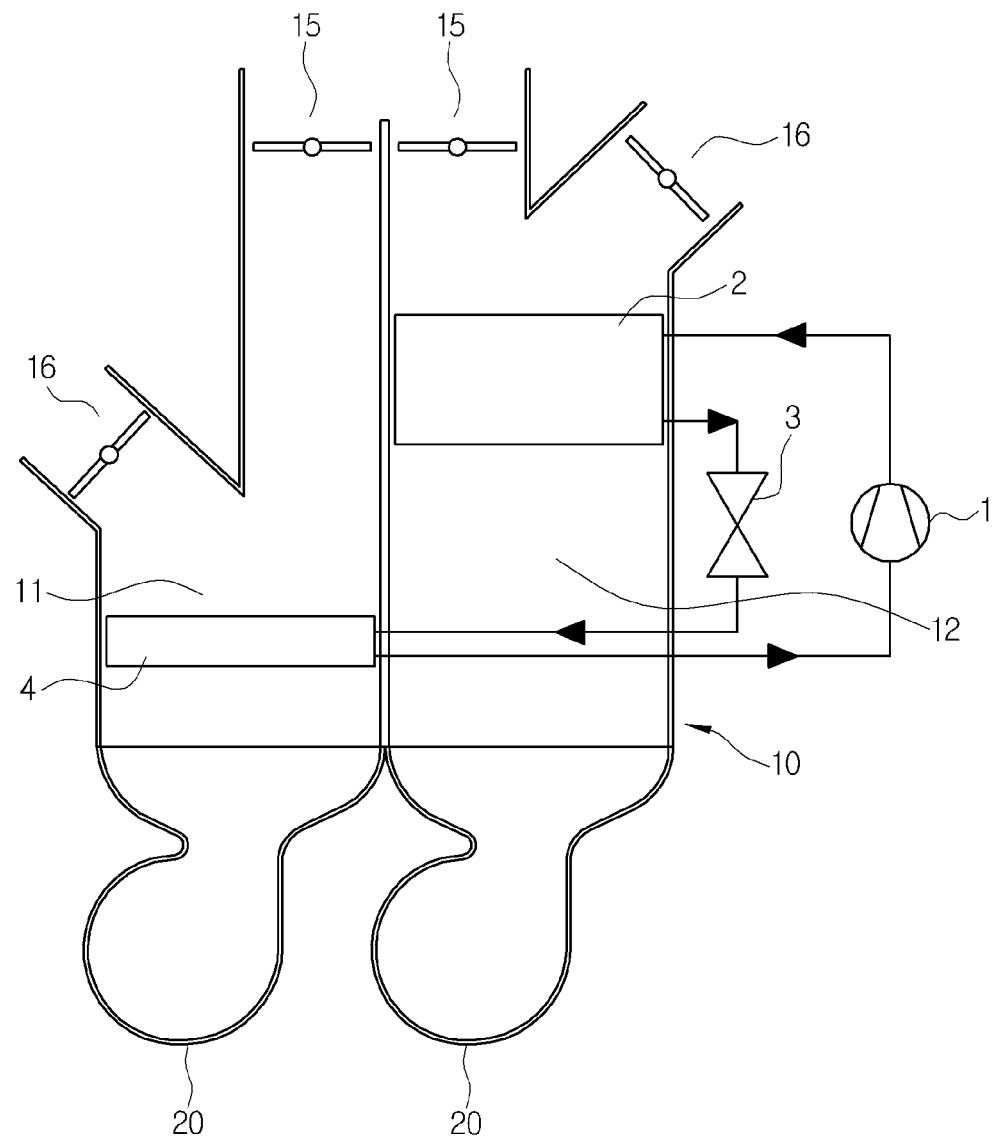
FIG. 2 is a view showing a heat pump system for a vehicle according to a prior art.
Figure 3:
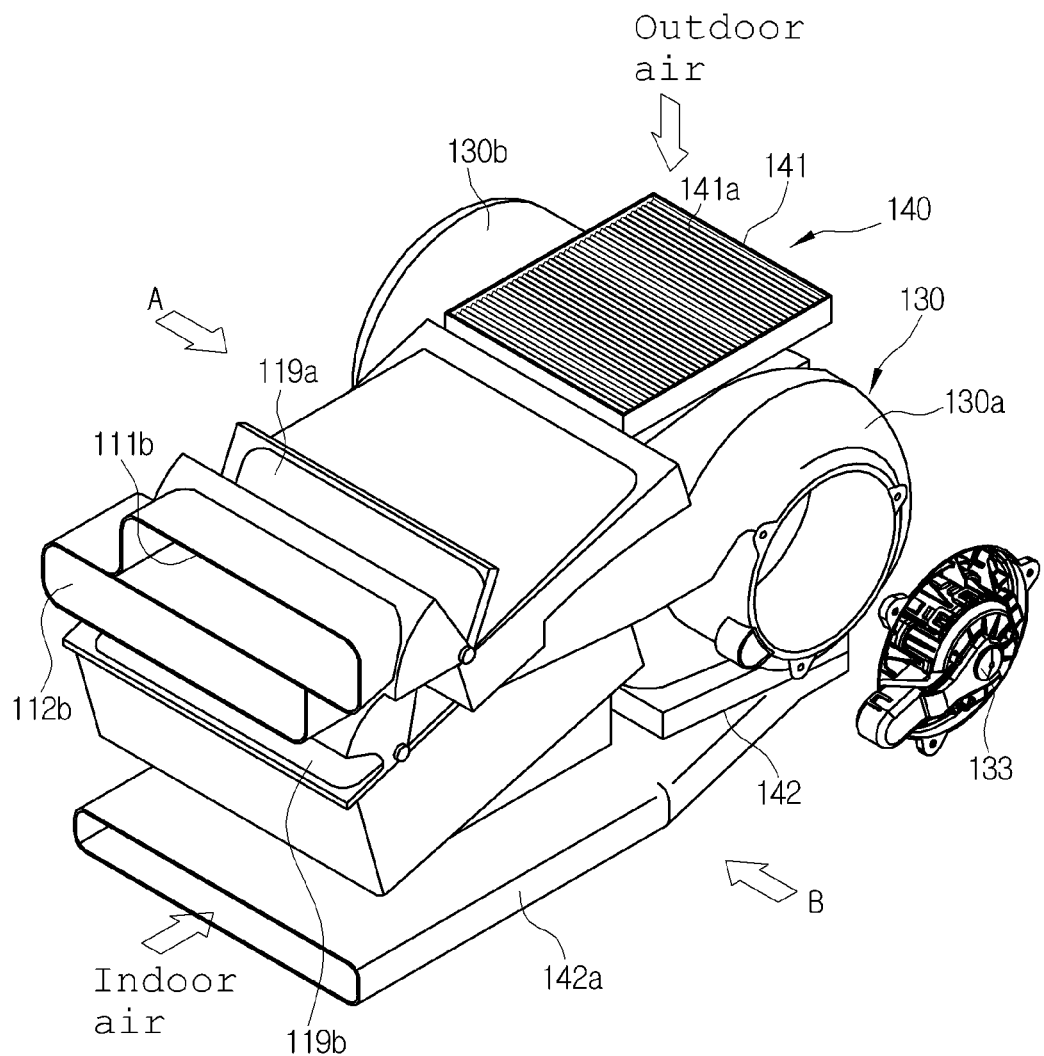
FIG. 3 is a perspective view showing a heat pump system for a vehicle according to the present invention.

Reference will be now made in detail to the preferred embodiment of the present invention with reference to the attached drawings.

As shown in the drawings, a heat pump system for a vehicle according to the present invention includes a compressor 101, a condenser 102, expansion means (not shown) and an evaporator 104 which are connected with one another through a refrigerant circulation line (P) so as to carry out cooling through the evaporator 104 and carry out heating through the condenser 102.

First, the compressor 100 inhales and compresses gas-phase refrigerant of low-temperature and low-pressure discharged from the evaporator 104 while operating by receiving a driving force from a power supply, such as an engine or a motor, and then, discharges the refrigerant in a gas phase of high-temperature and high-pressure.

The condenser 102 exchanges heat between the gas-phase refrigerant of high-temperature and high-pressure, which is discharged from the compressor 100 and flows inside the condenser 102, and air passing through the condenser 102, and in this instance, the refrigerant is condensed and the air is heated to be changed into warm air.

Such a condenser 102 may have a structure that the refrigerant circulation line or refrigerant pipe (P) is arranged in the form of a zigzag and a radiation fin (not shown) is mounted or a structure that a plurality of tubes (not shown) are stacked up and a radiation fin is mounted between the tubes.

Therefore, the gas-phase refrigerant of high-temperature and high-pressure discharged from the compressor 100 exchanges heat with the air to be condensed while flowing along the zigzag-shaped refrigerant circulation line or the tubes, and in this instance, the air passing through the condenser 102 is heated to be changed into warm air.

Moreover, the expansion means (not shown) rapidly expands liquid-phase refrigerant, which flows after being discharged from the condenser 102, by throttling effect and sends the expanded refrigerant in a saturated state of low-temperature and low-pressure to the evaporator 104.

The expansion means 103 may be an expansion valve or an orifice structure.

The evaporator 104 evaporates the liquid-phase refrigerant of low-pressure, which flows after being discharged from the expansion means, by exchanging heat between the liquid-phase refrigerant and the inside air of the air-conditioning case 110 so as to cool the air due to a heat absorption by an evaporative latent heat of the refrigerant.

Continuously, the gas-phase refrigerant of low-temperature and low-pressure evaporated and discharged from the evaporator 104 is inhaled to the compressor 100 again, and then, recirculates the above-mentioned cycle.

Furthermore, in the above-mentioned refrigerant circulation process, the air blown by a blower unit 130 is induced into the air-conditioning case 110, is cooled by the evaporative latent heat of the liquid-phase refrigerant circulating inside the evaporator 104, and then, is discharged to the interior of the vehicle in a cooled state, so that the interior of the vehicle is heated.

The air blown by the blower unit 130 is induced into the air-conditioning case 110, is heated by heat radiation of the gas-phase refrigerant of high-temperature and high-pressure circulating inside the condenser 102 while passing through the condenser 102, and then, is discharged to the interior of the vehicle in a heated state, so that the interior of the vehicle is cooled.

Additionally, the air-conditioning case 110 includes a cold air passageway 111 and a warm air passageway 112 partitioned by a partition wall 113, which partitions the inside of the air-conditioning case 110.

That is, the partition wall 113 is formed to partition the inside of the air-conditioning case 110 into an upper part and a lower part.

Hence, the cold air passageway 111 is arranged at the upper part from the partition wall 113 and the warm air passageway 112 is arranged at the lower part from the partition wall 113.

In addition, the evaporator 104 is mounted on the cold air passageway 111, and the condenser 102 is mounted on the warm air passageway 112, and in this instance, because the cold air passageway 111 and the warm air passageway 112 are respectively arranged at the upper part and the lower part, the evaporator 104 and the condenser 102 are also respectively arranged at the upper part and the lower part.

In other words, the blower unit 130 includes first and second blowers 130a and 130b and first and second motors respectively mounted to the first and second blowers 130a and 130b, and the evaporator 104 and the condenser 102 are arranged at right angles to the axial direction that rotary shafts of the motors 133 and 137 of the first and second blowers 130a and 130b face.

In the meantime, the evaporator 104 mounted on the cold air passageway 111 and the condenser 102 mounted on the warm air passageway 112 are mounted to be laid horizontally, and in this instance, the evaporator 104 and the condenser 102 may be mounted horizontally with the partition wall 113, but as shown in the drawing, it is preferable that the evaporator 104 and the condenser 102 be mounted to be inclined at a predetermined angle to the partition wall 113.

Moreover, a bypass passageway 114 is formed in the partition wall 113 to make some of the warm air passing the condenser 102 in the warm air passageway 112 bypass toward the cold air passageway 111.

In this instance, a bypass door 115 is mounted at one side of the bypass passageway 114 to open and close the bypass passageway 114.

The bypass door 115 closes the bypass passageway 114 in a cooling mode, and selectively opens the bypass passageway 114 in a heating mode.

Therefore, in a state where the bypass door 115 closes the bypass passageway 114, in the cooling mode, the cold air cooled by the evaporator 104 while flowing inside the cold air passageway 111 is supplied to the interior of the vehicle to carry out cooling, and in case of a heating mode, the warm air heated by the condenser 102 while flowing inside the warm air passageway 112 is supplied to the interior of the vehicle to carry out heating.

Furthermore, in the heating mode, when the bypass door 115 opens the bypass passageway 114, some of the warm air heated by the condenser 102 while flowing the warm air passageway 112 is bypassed toward the cold air passageway 111 through the bypass passageway 114 and is supplied to the evaporator 104, thereby increasing an air volume induced to the evaporator 104, promoting heat absorption of the evaporator 104 because temperature of the air induced into the evaporator 104 rises even in an extremely low temperature condition, and enhancing heating performance because temperature of the air discharged to the interior of the vehicle rises due to temperature and pressure rise of the refrigerant inside the system.

Additionally, some of the warm air heated by the condenser 102 is supplied to the evaporator 104 to prevent frosting of the evaporator 104.

In addition, the condenser 102 is mounted above the bypass passageway 114 in the air flow direction inside the warm air passageway 112. Therefore, the warm air heated while passing through the condenser 102 can be supplied toward the evaporator 104 through the bypass passageway 114.

In the meantime, the evaporator 104 is mounted below the bypass passageway 114 in the air flow direction inside the cold air passageway 111. Therefore, the warm air bypassing through the bypass passageway 114 passes through the evaporator 104.

Moreover, the blower unit for blowing air toward the cold air passageway 111 and the warm air passageway 112 is mounted at an inlet side of the air-conditioning case 110.

The blower unit 130 includes: a first blower 130a to which a discharge port 134 is connected at an inlet 111a of the cold air passageway 111 of the air-conditioning case 110 in order to blow air toward the cold air passageway 111; and a second blower 130b to which a discharge port 138 is connected at an inlet 112a of the warm air passageway 112 of the air-conditioning case 110 in order to blow air toward the warm air passageway 112.

The first blower 130a and the second blower 130b are arranged to face each other and to be spaced apart from each other in the width direction of the vehicle.

The first blower 130a includes: a scroll case 131 having the discharge port 134 to be connected to the inlet 111a of the cold air passageway 111 of the air-conditioning case 110; a blast fan 132 rotatably mounted inside the scroll case 131; an inlet ring 131a which is formed on one side of the scroll case 131 to induce indoor air and outdoor air; and a motor 133 which is mounted on the other side of the scroll case 131 to rotate the blast fan 132.

The inlet ring 131a is formed on the one side to which an intake duct 140 is joined inside the scroll case 131.

The second blower 130b includes: a scroll case 135 having the discharge port 138 to be connected to the inlet 112a of the warm air passageway 112 of the air-conditioning case 110; a blast fan 136 rotatably mounted inside the scroll case 135; an inlet ring 135a which is formed on one side of the scroll case 135 to induce indoor air and outdoor air; and a motor 137 which is mounted on the other side of the scroll case 135 to rotate the blast fan 136.

The inlet ring 135a is formed on the one side to which the intake duct 140 is joined inside the scroll case 135.

The first blower 130a and the second blower 130b are mounted in such a way that rotary shafts of the motors 133 and 137 are located in the same direction.

Furthermore, the inlet ring 131a of the first blower 130a and the inlet ring 135a of the second blower 130b are formed to face each other.

In the meantime, the scroll cases 131 and 135 of the first and second blowers 130a and 130b are formed in a scroll form based on the blast fans 132 and 136. Therefore, each of air passageways around the blast fans 132 and 136 inside the scroll cases 131 and 135 has a cross section that gets larger from a start point of the scroll toward an end point.

Additionally, capacity of the motor 137 of the second blower 130b is larger than capacity of the motor 133 of the first blower 130a.

That is, because heat radiation capacity of the condenser 102 inside the warm air passageway 112 is larger than that of the evaporator 104 inside the cold air passageway 111, it is preferable to make capacity of the motor 137 of the second blower 130b, which supplies air toward the warm air passageway 112, larger than capacity of the motor 133 of the first blower 130a.

In addition, the discharge ports 134 and 138 of the first and second blowers 130a and 130b are respectively formed to extend from the scroll-type end points of the scroll cases 131 and 135 and are respectively connected with the cold air passageway 111 and the warm air passageway 112.

Moreover, the first blower 130a and the second blower 130b are mounted such that the discharge port 134 of the first blower 130a and the discharge port 138 of the second blower 130b are arranged to cross each other.

In this instance, the discharge port 134 of the first blower 130a and the discharge port 138 of the second blower 130b are arranged to vertically cross each other.

That is, in the state that the first blower 130a and the second blower 130b are arranged side by side with each other in the width direction of the vehicle, the discharge port 134 of the first blower 130a and the discharge port 138 of the second blower 130b are arranged to vertically cross each other, so that the evaporator 104 of the cold air passageway 111 and the condenser 102 of the warm air passageway 112 can be arranged vertically, thereby reducing the size and manufacturing costs of the system because the system can be miniaturized easily.

In other words, the discharge port 134 of the first blower 130a and the discharge port 138 of the second blower 130b are arranged to vertically cross each other in order to blow air to the cold air passageway 111 and the warm air passageway 112 which are arranged vertically. Therefore, the discharge port 134 of the first blower 130a is connected to the cold air passageway 111 and the discharge port 138 of the second blower 130b is connected to the warm air passageway 112.

Furthermore, in the case that the discharge port 134 of the first blower 130a and the discharge port 138 of the second blower 130b are arranged to vertically cross each other, the first blower 130a and the second blower 130b are mounted in such a way that scroll directions of the scroll cases 131 and 135 are opposed to each other.

Figure 4:
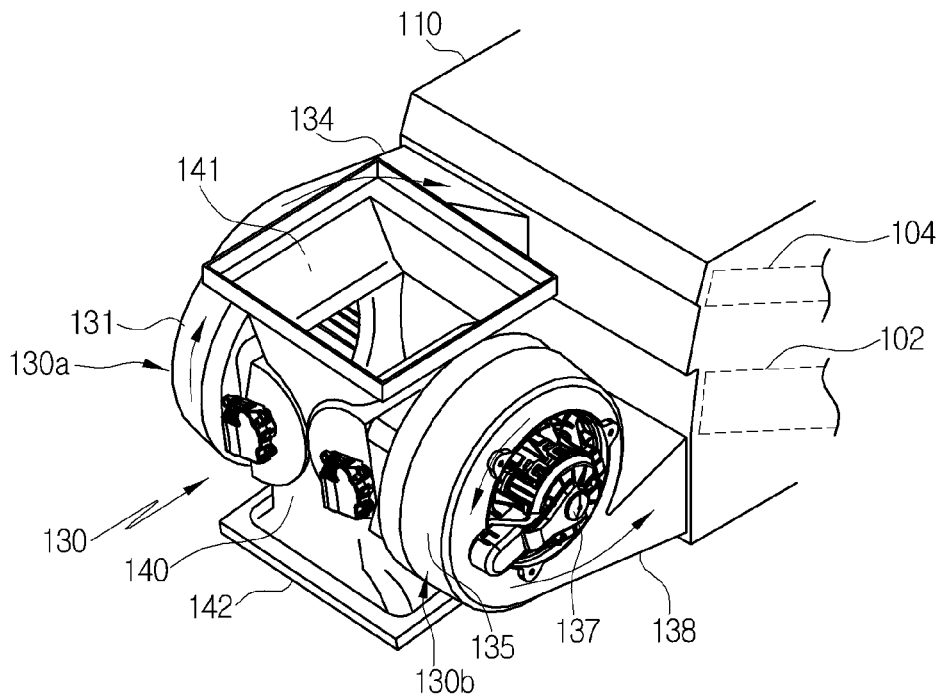
FIG. 4 is a partially perspective view showing first and second blowers of FIG. 3.
Figure 5:
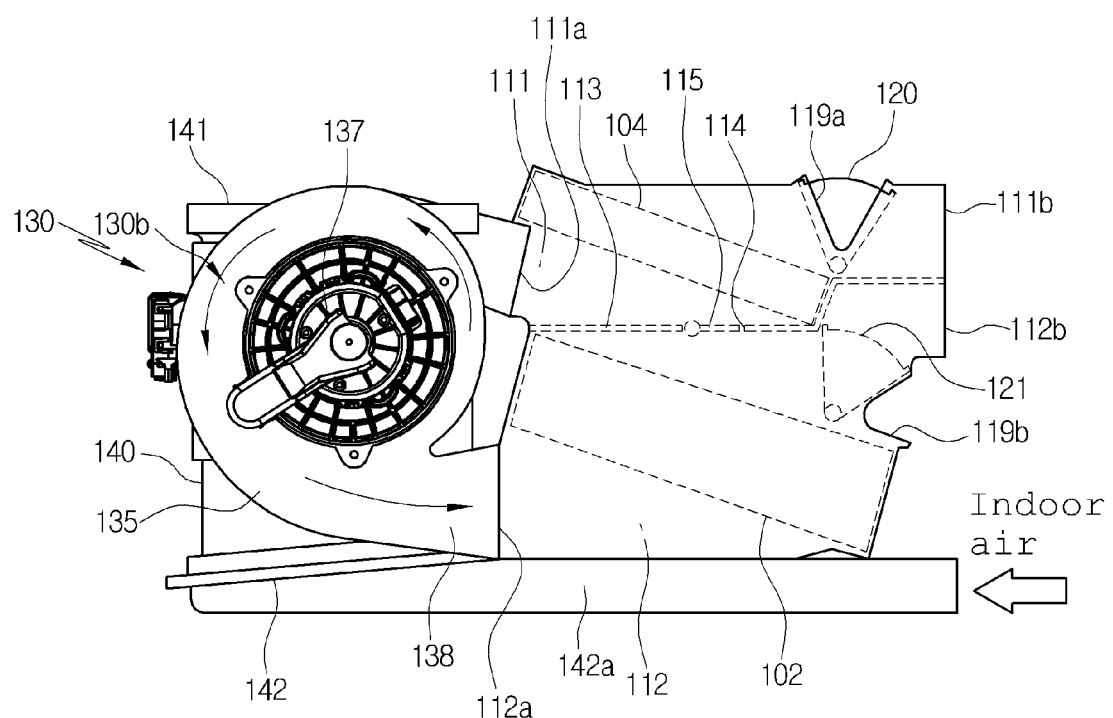
FIG. 5 is a side view from an A part of FIG. 3.
Figure 6:
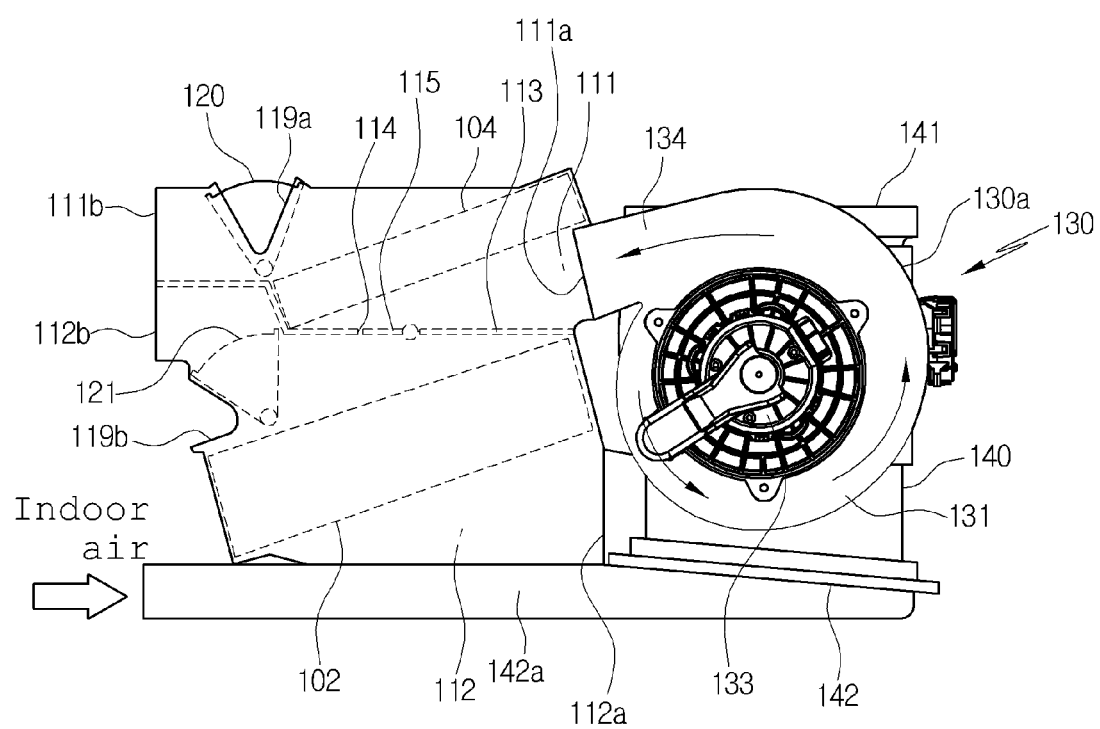
FIG. 6 is a side view from a B part of FIG. 3.
Figure 7:
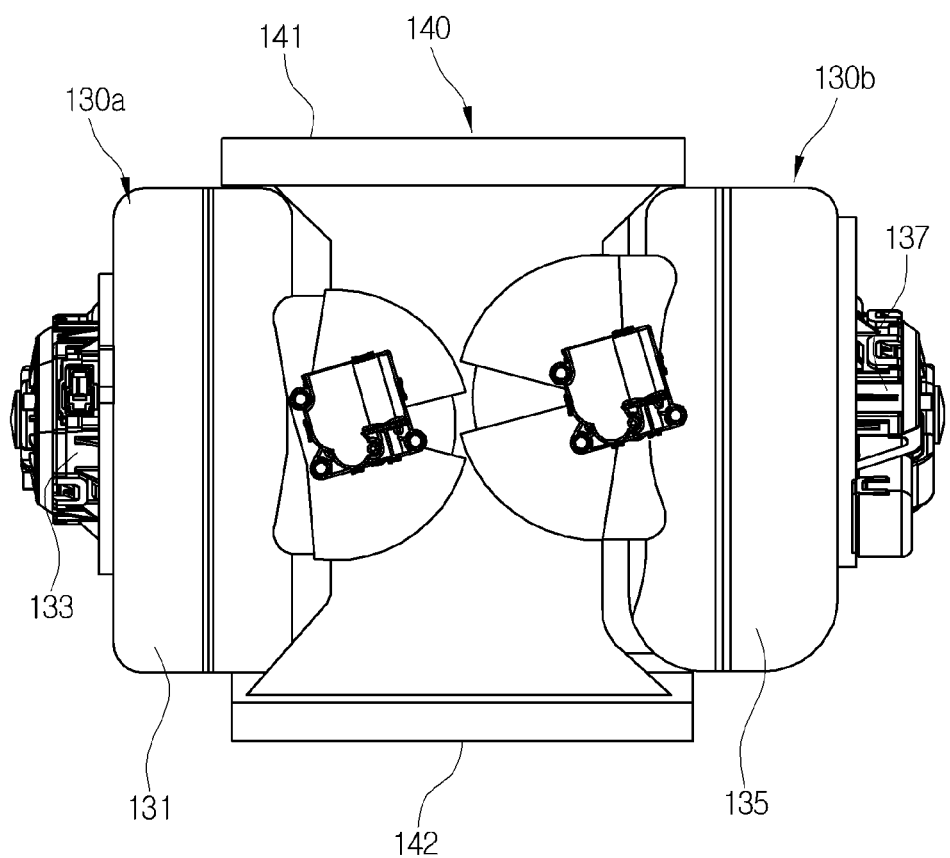
FIG. 7 is a front view of FIG. 4.

That is, referring to FIG. 4, the scroll of the scroll case 131 of the first blower 130a faces the clockwise direction so that the air flows in the clockwise direction inside the scroll case 131 and is blown to the cold air passageway 111.

The scroll of the scroll case 135 of the second blower 130b faces the counterclockwise direction so that the air flows in the counterclockwise direction inside the scroll case 135 and is blown to the warm air passageway 112.

As described above, because the scroll directions of the scroll cases 131 and 135 of the first and second blowers 130a and 130b are opposed to each other and the discharge port 134 of the first blower 130a and the discharge port 138 of the second blower 130b are arranged to vertically cross each other, the first and second blowers 130a and 130b can be in common use. That is, the two motors 133 and 137 mounted in the first and second blowers 130a and 130b can be used commonly so that the package can be minimized and space efficiency can be maximized.

Additionally, the intake duct 140 which is communicatingly connected with the first and second blowers 130a is mounted between the first blower 130a and the second blower 130b to supply indoor air and outdoor air to the first and second blowers 130a and 130b.

That is, because one intake duct 140 is mounted between the first blower 130a and the second blower 130b, the first and second blowers 130a and 130b can commonly use the one intake duct 140.

As described above, because the intake duct 140 is mounted between the first blower 130a and the second blower 130b, the system using the two blowers 130a and 130b which are operated individually uses just one intake duct 140 so as to maximize space efficiency and reduce the size and manufacturing costs of the system.

The intake duct 140 includes: an outdoor air inlet 141 for inducing outdoor air; an indoor air inlet 142 for inducing indoor air; and a first indoor and outdoor air converting door 147 and a second indoor and outdoor air converting door 148 each of which is mounted between the indoor air inlet 142 and the outdoor air inlet 141, the first indoor and outdoor air converting door 147 selectively opening the outdoor air inlet 141 and the indoor air inlet 142 for the first blower 130a, the second indoor and outdoor air converting door 148 selectively opening the outdoor air inlet 141 and the indoor air inlet 142 for the second blower 130b.

As shown in the drawings, preferably, the outdoor air inlet 141 is formed at an upper portion of the intake duct 140 and the indoor air inlet 142 is formed at a lower portion of the intake duct 140, but the positions of the outdoor air inlet 141 and the indoor air inlet 142 may be changed.

The first indoor and outdoor air converting door 147 is a dome-shaped door and is arranged on one side of the first blower 130a, and the second indoor and outdoor air converting door 148 is also a dome-shaped door and is arranged on one side of the second blower 130b.

In this instance, a rotary shaft of the first indoor and outdoor air converting door 147 is arranged at right angles to the rotary shaft of the motor 133 of the first blower 130a, and a rotary shaft of the second indoor and outdoor air converting door 148 is arranged at right angles to the rotary shaft of the motor 137 of the second blower 130b.

The first indoor and outdoor air converting door 147 and the second indoor and outdoor air converting door 148 may adopt not only the dome-shaped door type, but also one of various types, such as a flat door type (a center pivot flat door or an end pivot flat door), a sliding door type and others.

Meanwhile, an actuator is mounted on the outer face of the intake duct 140 in order to operate the first indoor and outdoor air converting door 147 and the second indoor and outdoor air converting door 148.

Moreover, inside the intake duct 140, formed are a first outdoor air inflow passageway 143 which communicates the outdoor air inlet 141 with the first blower 130*a*, a first indoor air inflow passageway 144 which communicates the indoor air inlet 142 with the first blower 130*a*, a second outdoor air inlet 145 which communicates the outdoor air inlet 141 with the second blower 130*b* and a second indoor air inflow passageway 146 which communicates the indoor air inlet 142 with the second blower 130*b*.

In this instance, the first indoor and outdoor air converting door 147 is mounted to open and close the first outdoor air inflow passageway 143 and the first indoor air inflow passageway 144, and the second first indoor and outdoor air converting door 148 is mounted to open and close the second outdoor air inflow passageway 145 and the second indoor air inflow passageway 146.

As described above, the one intake duct 140 is mounted between the first and second blowers 130*a* and 130*b* and the two indoor and outdoor air converting doors 147 and 148 are mounted inside the intake duct 140, so that the indoor air and the outdoor air induced into the outdoor air inlet 141 and the indoor air inlet 142 of the intake duct 140 can be selectively supplied to the first and second blowers 130*a* and 130*b*.

Figure 8:
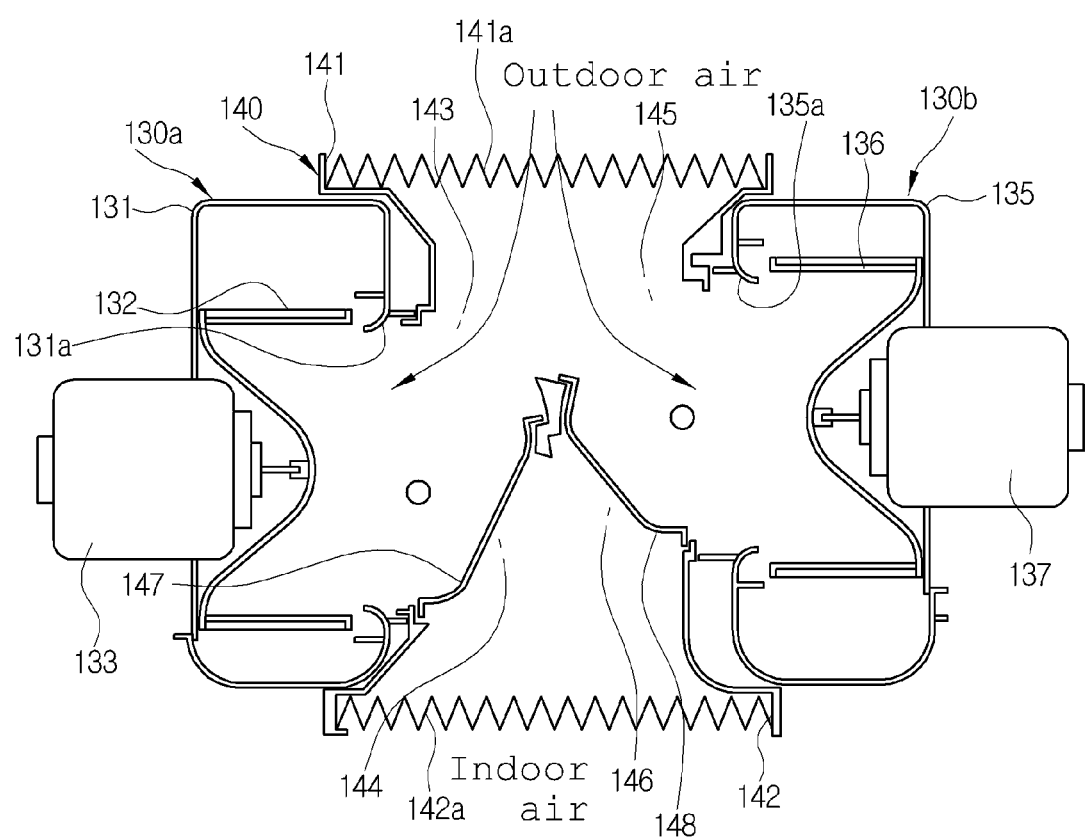
FIG. 8 is a sectional view showing an outdoor air inflow mode in FIG. 7.
Figure 9:
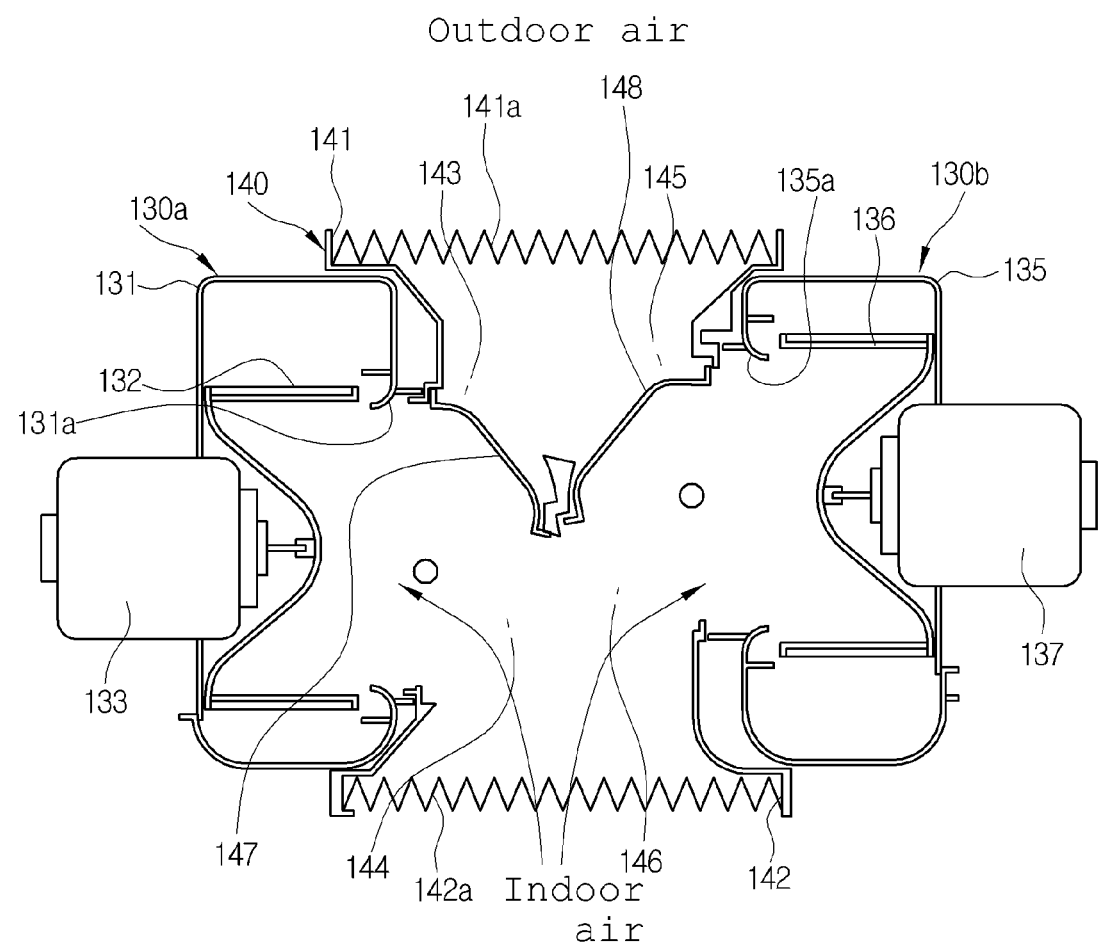
FIG. 9 is a sectional view showing an indoor air inflow mode in FIG. 7.

That is, by control of the indoor and outdoor air converting doors 147 and 148, outdoor air can be simultaneously supplied to the first blower 130*a* and the second blower 130*b* as shown in FIG. 8 indoor air can be simultaneously supplied to the first blower 130*a* and the second blower 130*b* as shown in FIG. 9.

Of course, not shown in the drawings, but indoor air can be supplied toward the first blower 130*a* and outdoor air can be supplied toward the second blower 130*b* by control of the indoor and outdoor air converting doors 147 and 148, or the reverse is possible.

In the meantime, the outdoor air inlet 141 of the intake duct 140 communicates with the exterior of the vehicle, and the indoor air inlet 142 of the intake duct 140 communicates with the interior of the vehicle.

In this instance, an indoor air inflow duct 142*a* is mounted on the air-conditioning case 110 to connect the indoor air inlet 142 of the intake duct 140 and the interior of the vehicle with each other.

Furthermore, air filters 141*a* and 141*b* are respectively mounted on the outdoor air inlet 141 and the indoor air inlet 142 so as to remove impurities contained in the air induced into the outdoor air inlet 141 and the indoor air inlet 142.

Additionally, on an outlet side of the cold air passageway 111 of the air-conditioning case 110, disposed are a cold air outflow port 111*b* for discharging the cold air passing through the evaporator 104 to the interior of the vehicle, a cold air discharge port 119*a* for discharging the cold air to the exterior of the vehicle, and a cold air mode door 120 for opening and closing the cold air outflow port 111*b* and the cold air discharge port 119*a*.

On an outlet side of the warm air passageway 112 of the air-conditioning case 110, disposed are a warm air outflow port 112*b* for discharging the warm air passing through the condenser 102 to the interior of the vehicle, a warm air discharge port 119*b* for discharging the warm air to the exterior of the vehicle, and a warm air mode door 121 for opening and closing the warm air outflow port 112*b* and the warm air discharge port 119*b*.

The cold air mode door 120 and the warm air mode door 121 are all dome-shaped doors. However, as shown in FIG. 15, the cold air mode door 120 and the warm air mode door 121 may be sliding type doors.

Figure 10:
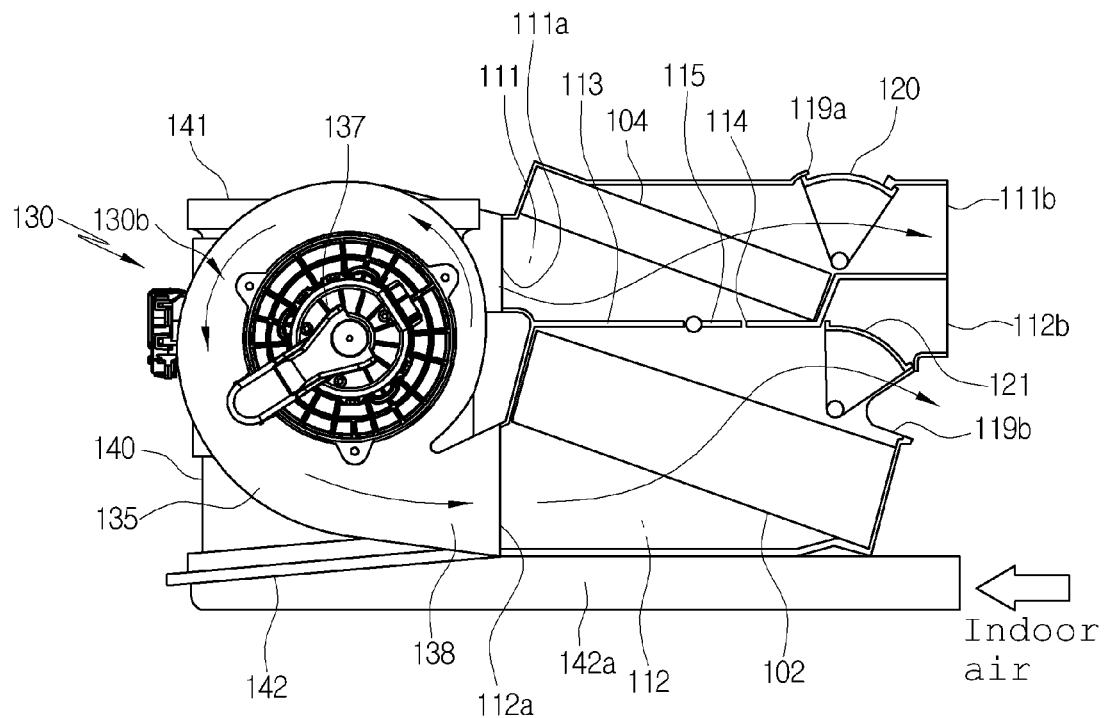
FIG. 10 is a view showing a cooling mode of the heat pump system for the vehicle according to the present invention.

Therefore, as shown in FIG. 10, in the cooling mode, when the cold air outflow port 111*b* and the warm air discharge port are opened, the air flowing inside the cold air passageway 111 is cooled while passing through the evaporator 104, and then, is discharged to the interior of the vehicle through the cold air outflow port 111*b* to carry out cooling. In this instance, the air flowing inside the warm air passageway 112 is heated while passing through the condenser 102, and then, is discharged to the exterior of the vehicle through the warm air discharge port 119*b*.

Figure 11:
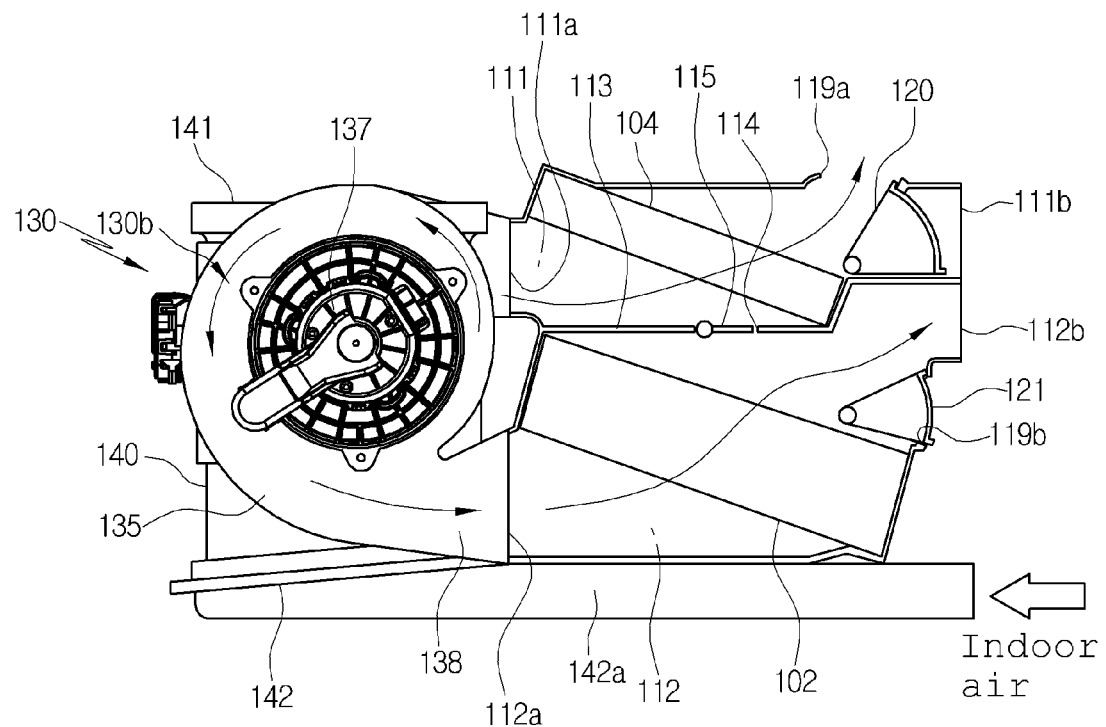
FIG. 11 is a view showing a heating mode of the heat pump system for the vehicle according to the present invention.

In the heating mode, as shown in FIG. 11, when the warm air outflow port 112*b* and the cold air discharge port 119*a* are opened, the air flowing inside the warm air passageway 112 is heated while passing through the condenser 102, and then, is discharged to the interior of the vehicle through the warm air outflow port 112*b* to carry out heating. In this instance, the air flowing inside the cold air passageway 111 is cooled while passing through the evaporator 104, and then, is discharged to the exterior of the vehicle through the cold air discharge port 119*a*.

Figure 13:
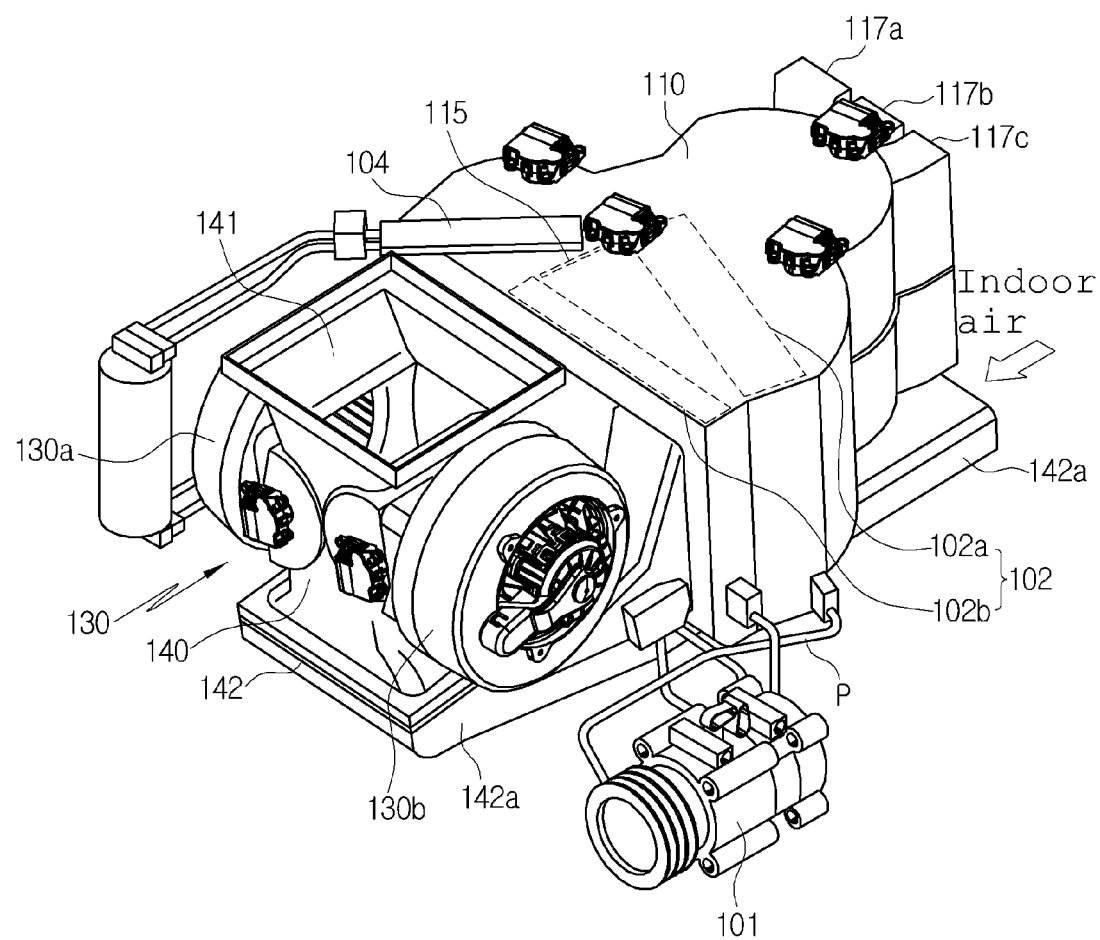
FIG. 13 is a perspective view of a heat pump system for a vehicle according to another preferred embodiment of the present invention.
Figure 14:
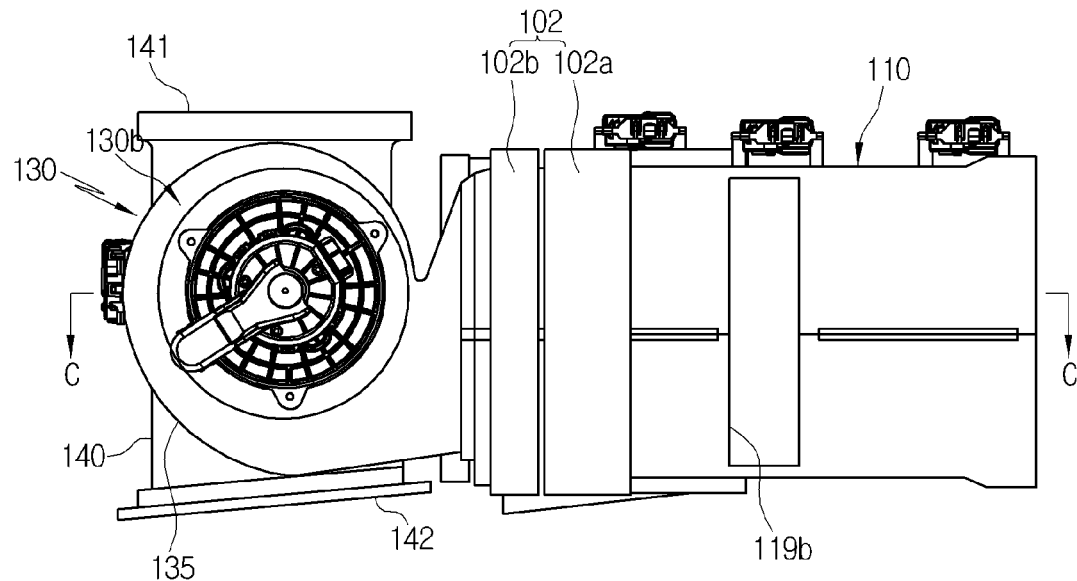
FIG. 14 is a side view of FIG. 13.
Figure 15:
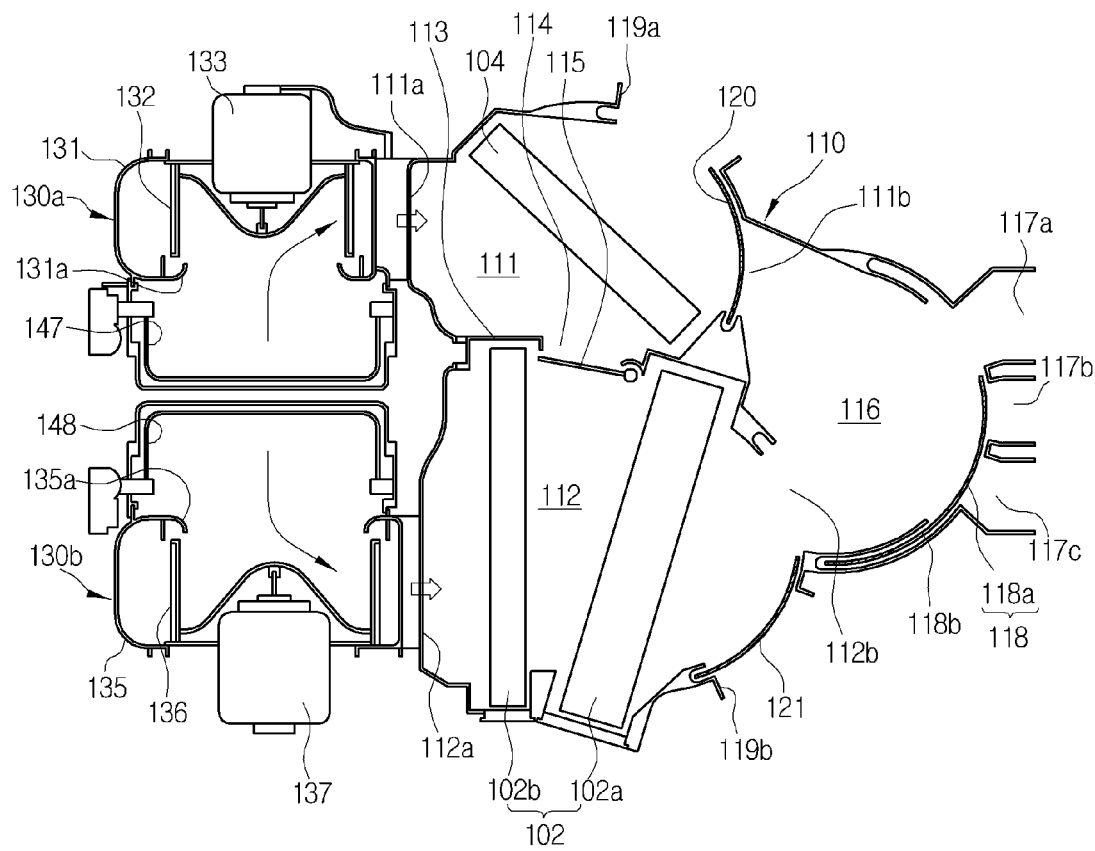
FIG. 15 is a sectional view taken along the line of C-C of FIG. 14.

FIG. 13 is a perspective view of a heat pump system for a vehicle according to another preferred embodiment of the present invention, FIG. 14 is a side view of FIG. 13, and FIG. 15 is a sectional view taken along the line of C-C of FIG. 14. In this embodiment, only parts which are different from the former embodiment of the present invention will be described.

In this preferred embodiment of the heat pump system for the vehicle, the cold air passageway 111 and the warm air passageway 112 are arranged inside the air-conditioning case 110 in the width direction (lateral direction) of the vehicle. That is, the cold air passageway 111 and the warm air passageway 112 are respectively arranged in the axial directions of the blast fans 132 and 136 of the first and second blowers 130*a* and 130*b*.

Moreover, in this embodiment, two condensers 102 are mounted: one being a first condenser 102*a* which is mounted below the bypass passageway 114 in the air flow direction inside the warm air passageway 112; and the other one being a second condenser 102*b* which is mounted above the bypass passageway 114.

Therefore, gas-phase refrigerant discharged from the compressor 101 is condensed in the first condenser 102*a*, and then, is recondensed in the second condenser 102*b*.

In this instance, the first condenser 102*a* and the second condenser 102*b* are connected to the refrigerant circulation line (P) at the outlet side of the compressor 101 in order, and heat radiation capacity of the first condenser 102*a* is larger than that of the second condenser 102*b*.

Furthermore, the first condenser 102*a* and the second condenser 102*b* are mounted to get apart from each other at a predetermined angle based on the bypass passageway 114, so that some of the warm air heated while passing through the second condenser 102*b* flows to the bypass passageway 114 and the remaining warm air flows to the first condenser 102*a*.

Additionally, a mixing zone 116 where the cold air passing through the cold air outflow port 111*b* and the warm air passing through the warm air outflow port 112*b* are mixed is formed on the cold air outflow port 111*b* and the warm air outflow port 112*b*.

The mixing zone 116 is formed such that the cold air outflow port 111*b* and the warm air outflow port 112*b* are communicated with each other so that the cold air passing through cold air outflow port 111b and the warm air passing through the warm air outflow port 112b are mixed together, thereby properly controlling temperature of the air discharged to the interior of the vehicle.

A plurality of air outflow ports is formed at one side of the mixing zone 116 to discharge the air inside the mixing zone 116 toward the interior of the air, and a discharge mode door 118 is disposed on the inner face of the mixing zone 116 to control the degree of opening of the air outflow ports.

The discharge mode door 118 is a sliding-type door and includes: an arc-shaped door plate 118a; and a gear shaft (not shown) which is geared with the door plate 118a to slide the door plate 118a.

The door plate 118a has an opening portion 118b for opening a specific air outflow port.

Each of the air outflow ports include: a defrost vent 117a for discharging wind toward the front window of the vehicle; a face vent 117b for discharging wind toward a passenger's face; and a floor vent 117c for discharging wind toward the passenger's feet.

Hereinafter, a refrigerant flowing process of the heat pump system for the vehicle according to the present invention will be described.

First, the gas-phase refrigerant of high-temperature and high-pressured discharged after being compressed in the compressor 101 is induced into the condenser 102.

The gas-phase refrigerant induced into the condenser 102 exchanges heat with the air passing through the condenser 102, and in the above process, the refrigerant is cooled and is liquefied while being cooled.

The liquid-phase refrigerant discharged from the condenser 102 is induced into the expansion means to be decompressed and expanded.

The refrigerant decompressed and expanded in the expansion means becomes an atomized state of low-temperature and low-pressure and is induced into the evaporator 104. The refrigerant induced into the evaporator 104 exchanges heat with the air passing through the evaporator 104 to be evaporated.

After that, the refrigerant of low-temperature and low-pressure discharged from the evaporator 104 is induced into the compressor 100, and then, recirculates the above-mentioned refrigeration cycle.

Hereinafter, referring to FIGS. 10 to 12, air flow processes in the cooling mode, in the heating mode and in the condition that temperature of the outdoor air is low will be described.

A. Cooling Mode

In the cooling mode, as shown in FIG. 10, the cold air mode door 120 opens the cold air outflow port 111b, and the warm air mode door 121 opens the warm air discharge port 119b.

Additionally, the first and second indoor and outdoor air converting doors 147 and 148 are operated according to the indoor air inflow mode or the outdoor air inflow mode to selectively supply the indoor air or the outdoor air toward the first and second blowers 130a and 130b.

Therefore, when the first and second blowers 130a and 130b are operated, the indoor air or the outdoor air induced into the intake duct 140 is inhaled to the first and second blowers 130a and 130b, and then, is supplied to the cold air passageway 111 and the warm air passageway 112.

The air supplied to the cold air passageway 111 is cooled while passing through the evaporator 104, and then, is discharged to the interior of the vehicle through the cold air outflow port 111b to carrying out cooling.

In this instance, the air supplied to the warm air passageway 112 is heated while passing through the condenser 102, and then, is discharged to the exterior of the vehicle through the warm air discharge port 119b.

In the meantime, as shown in FIGS. 13 to 15, if the heat pump system includes the mixing zone 116 and the air outflow ports, the heat pump system can realize various air discharge modes through the discharge mode door 118 so as to supply air to a specific position inside the vehicle.

B. Heating Mode

In the heating mode, as shown in FIG. 11, the warm air mode door 121 opens the warm air outflow port 112b, and the cold air mode door 120 opens the cold air discharge port 119a.

Furthermore, the first and second indoor and outdoor air converting doors 147 and 148 are operated according to the indoor air inflow mode or the outdoor air inflow mode to selectively supply the indoor air or the outdoor air toward the first and second blowers 130a and 130b.

Therefore, when the first and second blowers 130a and 130b are operated, the indoor air or the outdoor air induced into the intake duct 140 is inhaled to the first and second blowers 130a and 130b, and then, is supplied to the cold air passageway 111 and the warm air passageway 112.

The air supplied to the warm air passageway 112 is heated while passing through the condenser 102, and then, is discharged to the interior of the vehicle through the warm air outflow port 112b to carry out heating.

In this instance, the air supplied to the cold air passageway 111 is cooled while passing through the evaporator 104, and then, is discharged to the exterior of the vehicle through the cold air discharge port 119a.

In the meantime, as shown in FIGS. 13 to 15, if the heat pump system includes the mixing zone 116 and the air outflow ports, the heat pump system can realize various air discharge modes through the discharge mode door 118 so as to supply air to a specific position inside the vehicle.

C. Heating Mode Under the Condition that Temperature of the Outdoor Air is Low

Figure 12:
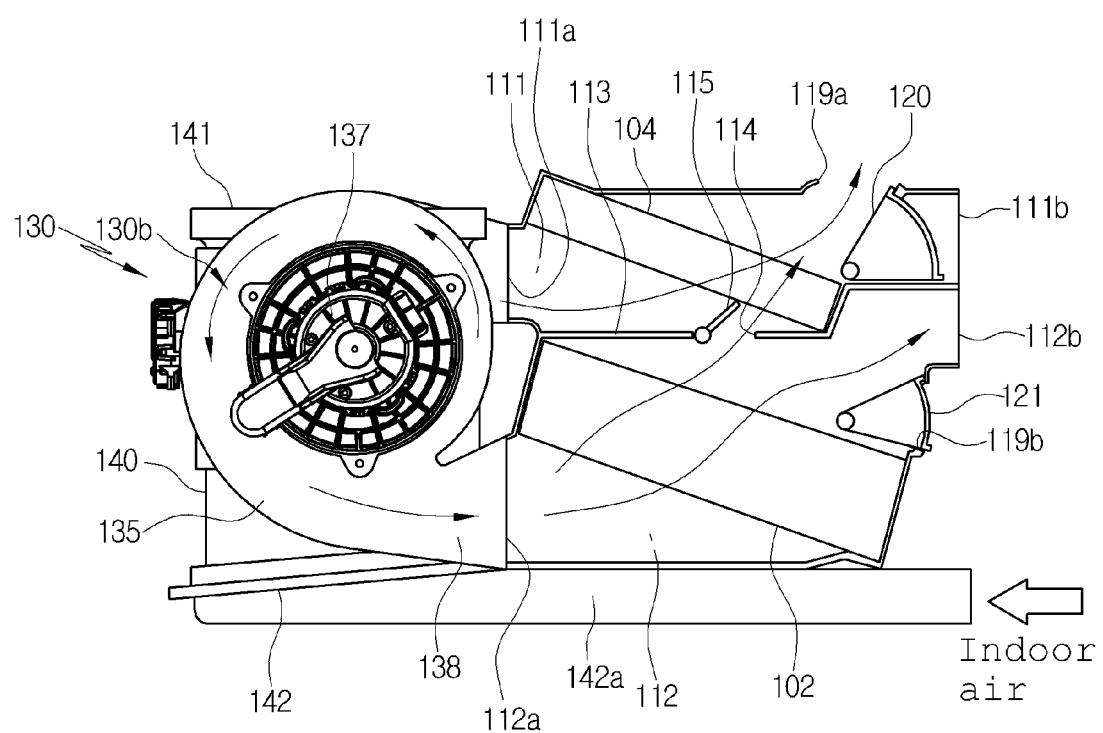
FIG. 12 is a view showing the heating mode under a condition that temperature of the outdoor air of the heat pump system is low.

In the heating mode under the condition that temperature of the outdoor air is low, such as in extremely low temperature surroundings, as shown in FIG. 12, the warm air mode door 121 opens the warm air outflow port 112b, and the cold air mode door 120 opens the cold air discharge port 119a.

Additionally, the bypass door 115 opens the bypass passageway 114.

Furthermore, the first and second indoor and outdoor air converting doors 147 and 148 are operated according to the indoor air inflow mode or the outdoor air inflow mode to selectively supply the indoor air or the outdoor air toward the first and second blowers 130a and 130b.

Therefore, when the first and second blowers 130a and 130b are operated, the indoor air or the outdoor air induced into the intake duct 140 is inhaled to the first and second blowers 130a and 130b, and then, is supplied to the cold air passageway 111 and the warm air passageway 112.

The air supplied to the warm air passageway 112 is heated while passing through the condenser 102, and then, is discharged to the interior of the vehicle through the warm air outflow port 112b to carry out heating.

In this instance, the air supplied to the cold air passageway 111 is cooled by heat absorption of the evaporator 104 while passing through the evaporator 104, and then, is discharged to the exterior of the vehicle through the cold air discharge port 119a.

In addition, some of the warm air heated while passing through the condenser 102 of the warm air passageway 112 is bypassed toward the cold air passageway 111 through the bypass passageway 114 to be supplied to the evaporator 104, thereby increasing air volume induced into the evaporator 104, increasing temperature of the air induced into the evaporator 104 even in the extremely low surroundings, and increasing temperature of the air discharged to the interior of the vehicle due to increase of temperature and pressure of the refrigerant inside the system so as to enhance heating performance.

The invention claimed is:

1. A heat pump system for a vehicle which includes a compressor, a condenser, expansion means and an evaporator connected with one another through a refrigerant circulation line, comprising:
   an air-conditioning case having a cold air passageway in which the evaporator is installed and a warm air passageway in which the condenser is installed and a partition wall partitioning the cold air passageway and the warm air passageway from one another inside of the air-conditioning case;
   a first blower which is mounted on an inlet of the cold air passageway of the air-conditioning case to blow air toward the cold air passageway;
   a second blower which is mounted on an inlet of the warm air passageway of the air-conditioning case to blow air toward the warm air passageway;
   an intake duct which is communicatingly mounted between the first blower and the second blower to supply indoor air and outdoor air to the first blower and the second blower; and
   the first blower including a first scroll case having a first inlet ring and the second blower including a second scroll case including a second inlet ring, and wherein the first and second inlet rings face one another and wherein the first and second scroll cases and the intake duct are aligned with one another along a first axis, and wherein the first and second scroll cases each have a top surface and a bottom surface opposite one another in a vertical direction being perpendicular to the first axis; and
   wherein the first scroll case defines a first discharge port connected to the inlet of one of the cold and warm air passageways of the air conditioning case, wherein the second scroll case defines a second discharge port connected to the inlet of the other of the cold and warm air passageways of the air-conditioning case, and wherein the first discharge port extends tangentially from the top surface of the first scroll case in a horizontal direction that is perpendicular to the first axis and the vertical direction, and wherein the second discharge port extends tangentially from the bottom surface of the second scroll case in the horizontal direction.

2. The heat pump system according to claim 1, wherein the intake duct comprises: an outdoor air inlet for inducing outdoor air; an indoor air inlet for inducing indoor air; and a first indoor and outdoor air converting door and a second indoor and outdoor air converting door each of which is mounted between the indoor air inlet and the outdoor air inlet, the first indoor and outdoor air converting door selectively opening the outdoor air inlet and the indoor air inlet for the first blower, the second indoor and outdoor air converting door selectively opening the outdoor air inlet and the indoor air inlet for the second blower.

3. The heat pump system according to claim 2, wherein the intake duct further comprises a first outdoor air inflow passageway which communicates the outdoor air inlet with the first blower, a first indoor air inflow passageway which communicates the indoor air inlet with the first blower, a second outdoor air inlet which communicates the outdoor air inlet with the second blower and a second indoor air inflow passageway which communicates the indoor air inlet with the second blower,
   wherein the first indoor and outdoor air converting door is mounted to open and close the first outdoor air inflow passageway and the first indoor air inflow passageway, and
   wherein the second indoor and outdoor air converting door is mounted to open and close the second outdoor air inlet and the second indoor air inflow passageway.

4. The heat pump system according to claim 2, wherein an indoor air inflow duct is mounted on the air-conditioning case to connect the indoor air inlet of the intake duct and the interior of the vehicle with each other.

5. The heat pump system according to claim 2, wherein the first blower further comprises: the first scroll case being connected to the inlet of the cold air passageway of the air-conditioning case; a first blast fan rotatably mounted inside the first scroll case; the first inlet ring being formed on a first side of the first scroll case to induce indoor air and outdoor air from the intake duct; and a first motor which is mounted on a second side of the first scroll case to rotate the first blast fan, and
   wherein the second blower further comprises: a second scroll case which is connected to the inlet of the warm air passageway of the air-conditioning case; a second blast fan rotatably mounted inside the second scroll case; the second inlet ring being formed on a first side of the second scroll case to induce indoor air and outdoor air from the intake duct; and a second motor which is mounted on a second side of the second scroll case to rotate the blast fan.

6. The heat pump system according to claim 5, wherein capacity of the second motor of the second blower is larger than that of the first motor of the first blower.

7. The heat pump system according to claim 5, wherein a rotary shaft of the first indoor and outdoor air converting door is arranged at right angles to a first rotary shaft of the first motor of the first blower, and a rotary shaft of the second indoor and outdoor air converting door is arranged at right angles to a second rotary shaft of the second motor of the second blower.

8. The heat pump system according to claim 5, wherein the first blower and the second blower are mounted in such a way that scroll directions of the first and second scroll cases are opposed to each other.

9. The heat pump system according to claim 1, wherein a bypass passageway is formed in the partition wall to make some of the warm air passing the condenser in the warm air passageway bypass toward the cold air passageway, and
   wherein a bypass door is mounted at one side of the bypass passageway to open and close the bypass passageway.

10. The heat pump system according to claim 9, wherein the condenser comprises: a first condenser which is mounted below the bypass passageway and a second condenser which is mounted above the bypass passageway in the air flow direction inside the warm air passageway.

11. The heat pump system according to claim 1, wherein a cold air outflow port for discharging the cold air passing through the evaporator to the interior of the vehicle, a cold air discharge port for discharging the cold air to the exterior of the vehicle and a cold air mode door for opening and closing the cold air outflow port and the cold air discharge port are disposed on an outlet side of the cold air passageway of the air-conditioning case, and wherein a warm air outflow port for discharging the warm air passing through the condenser to the interior of the vehicle, a warm air discharge port for discharging the warm air to the exterior of the vehicle and a warm air mode door for opening and closing the warm air outflow port and the warm air discharge port are disposed on an outlet side of the warm air passageway of the air-conditioning case.

12. The heat pump system according to claim 11, wherein a mixing zone where the cold air passing through the cold air outflow port and the warm air passing through the warm air outflow port are mixed is formed on the cold air outflow port and the warm air outflow port, and wherein a plurality of air outflow ports for discharging the air inside the mixing zone toward the interior of the vehicle and a discharge mode door for controlling the degree of opening of the air outflow ports are disposed on one side of the mixing zone.

13. The heat pump system according to claim 1, wherein the first blower and the second blower are mounted such that the first discharge port of the first blower, which is connected to the inlet of the cold air passageway of the air-conditioning case, and the second discharge port of the second blower, which is connected to the inlet of the warm air passageway of the air-conditioning case, are arranged to cross each other.

14. The heat pump system according to claim 13, wherein the partition wall partitions the inside of the air-conditioning case into an upper part and a lower part, and wherein the cold air passageway is arranged at the upper part from the partition wall and the warm air passageway is arranged at the lower part from the partition wall.

15. The heat pump system according to claim 14, wherein the first discharge port of the first blower and the second discharge port of the second blower are arranged to vertically cross each other.

16. The heat pump system according to claim 1 wherein the first and second inlet rings each face and are fluidly connected to the intake duct.

17. The heat pump system according to claim 1 wherein the intake duct extends in the vertical direction.

18. The heat pump system according to claim 1 wherein the first blower includes a first blast fan that is rotatable about the first axis in a first direction and wherein the second blower includes a second blast fan that is rotatable about the first axis in a second direction opposite the first direction.

19. The heat pump system according to claim 1 wherein the cold air passageway and the warm air passageway are stacked in the vertical direction.

20. A heat pump system for a vehicle which includes a compressor, a condenser, expansion means and an evaporator connected with one another through a refrigerant circulation line, comprising:

an air-conditioning case having a cold air passageway in which the evaporator is installed and a warm air passageway in which the condenser is installed and a partition wall partitioning the cold air passageway and the warm air passageway from one another inside of the air-conditioning case;

a first blower which is mounted on an inlet of the cold air passageway of the air-conditioning case to blow air toward the cold air passageway;

a second blower which is mounted on an inlet of the warm air passageway of the air-conditioning case to blow air toward the warm air passageway;

an intake duct which is communicatingly mounted between the first blower and the second blower to supply indoor air and outdoor air to the first blower and the second blower; and the first blower including a first scroll case having a first inlet ring and the second blower including a second scroll case including a second inlet ring, and wherein the first and second inlet rings face one another and wherein the first and second scroll cases and the intake duct are aligned with one another along a first axis, and wherein the first and second scroll cases each have a top surface and a bottom surface opposite one another in a vertical direction being perpendicular to the first axis;

wherein the first scroll case defines a first discharge port connected to the inlet of one of the cold and warm air passageways of the air conditioning case, wherein the second scroll case defines a second discharge port connected to the inlet of the other of the cold and warm air passageways of the air-conditioning case, and wherein the first discharge port extends tangentially from the top surface of the first scroll case in a horizontal direction that is perpendicular to the first axis and the vertical direction, and wherein the second discharge port extends tangentially from the bottom surface of the second scroll case in the horizontal direction;

wherein the intake duct extends in the vertical direction between a first part defining an outdoor inlet and a second part defining an indoor air inlet.

* * * * *